United States Patent
Immink et al.

(10) Patent No.: US 6,414,919 B1
(45) Date of Patent: Jul. 2, 2002

(54) DEVICE HAVING A FIRST OPERATIONAL STATE FOR WRITING INFORMATION ONTO A RECORD CARRIER

(75) Inventors: Albert H. J. Immink; Eise C. Dijkmans; Johannes A. T. M. Van Den Homberg, all of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/459,623

(22) Filed: Dec. 13, 1999

(30) Foreign Application Priority Data

Dec. 24, 1998 (EP) .............................. 98204434

(51) Int. Cl.⁷ ................................. G11B 7/00
(52) U.S. Cl. ................ 369/47.28; 369/47.48; 369/59.1; 369/47.5
(58) Field of Search ............... 369/47.1, 47.11, 369/47.15, 47.28, 47.29, 47.3, 47.32, 47.34, 47.48, 47.5, 47.51, 53.1, 53.34, 59.1

(56) References Cited

U.S. PATENT DOCUMENTS

| | | | |
|---|---|---|---|
| 5,126,985 A | 6/1992 | Spruit et al. | 369/13 |
| 5,835,469 A | * 11/1998 | Maeda et al. | 369/44.26 |
| 6,331,966 B1 | * 12/2001 | Minami et al. | 369/53.26 X |

FOREIGN PATENT DOCUMENTS

EP 0120389 A2 3/1984

* cited by examiner

Primary Examiner—Muhammad Edun
(74) Attorney, Agent, or Firm—Michael E. Belk

(57) ABSTRACT

A device has a first operational state for writing information onto a record carrier and a second operational state for reading information from a record carrier. The device includes a phase-locked loop for generating a clock signal from a reference signal and a control unit for generating a pulsed transducer control signal in response to an information signal and the clock signal. The device also includes a generating transducer for generating physically detectable patterns in the record carrier in response to the transducer control signal and a read transducer for generating a read signal in response to physically detectable patterns in the record carrier in the second operational state that includes a radiation source. The device further includes a power supply which supplies the radiation source with an electric power. The phase-locked loop includes a memory for memorizing, in the first operational state, a memory value which is a measure of the supplied clock signal. In the second operational state, the phase-locked loop generates the clock signal in response to the memorized memory value and causes a high-frequency modulation in the electric power supplied by the power supply.

8 Claims, 6 Drawing Sheets

|  | SEL1 | SEL2 | $T_A$ | $S_{MOD}$ |
|---|---|---|---|---|
| WRITE 3*TI | 0 | 2 | 6 | 0 |
|  | 0 | 3 | 4 | 0 |
|  | 0 | 0 | 4 | 0 |
|  | 0 | 3 | 4 | 0 |
|  | 0 | 1 | 6 | 0 |
| WRITE 4*TI | 0 | 2 | 6 | 0 |
|  | ≈ | ≈ | ≈ | ≈ |
| WRITE 8*TI | 0 | 2 | 6 | 0 |
|  | 0 | 3 | 4 | 0 |
|  | 0 | 0 | 4 | 0 |
|  | 0 | 3 | 4 | 0 |
|  | 0 | 0 | 4 | 0 |
|  | 0 | 3 | 4 | 0 |
|  | 0 | 0 | 4 | 0 |
|  | 0 | 3 | 4 | 0 |
|  | 0 | 0 | 4 | 0 |
|  | 0 | 3 | 4 | 0 |
|  | 0 | 0 | 4 | 0 |
|  | 0 | 3 | 4 | 0 |
|  | 0 | 0 | 4 | 0 |
|  | 0 | 3 | 4 | 0 |
|  | 0 | 1 | 6 | 0 |
|  | ≈ | ≈ | ≈ | ≈ |
| ERASE | 0 | 2 | 8 | 0 |
| READ | 0 | 1 | 8 | 1 |

FIG. 4

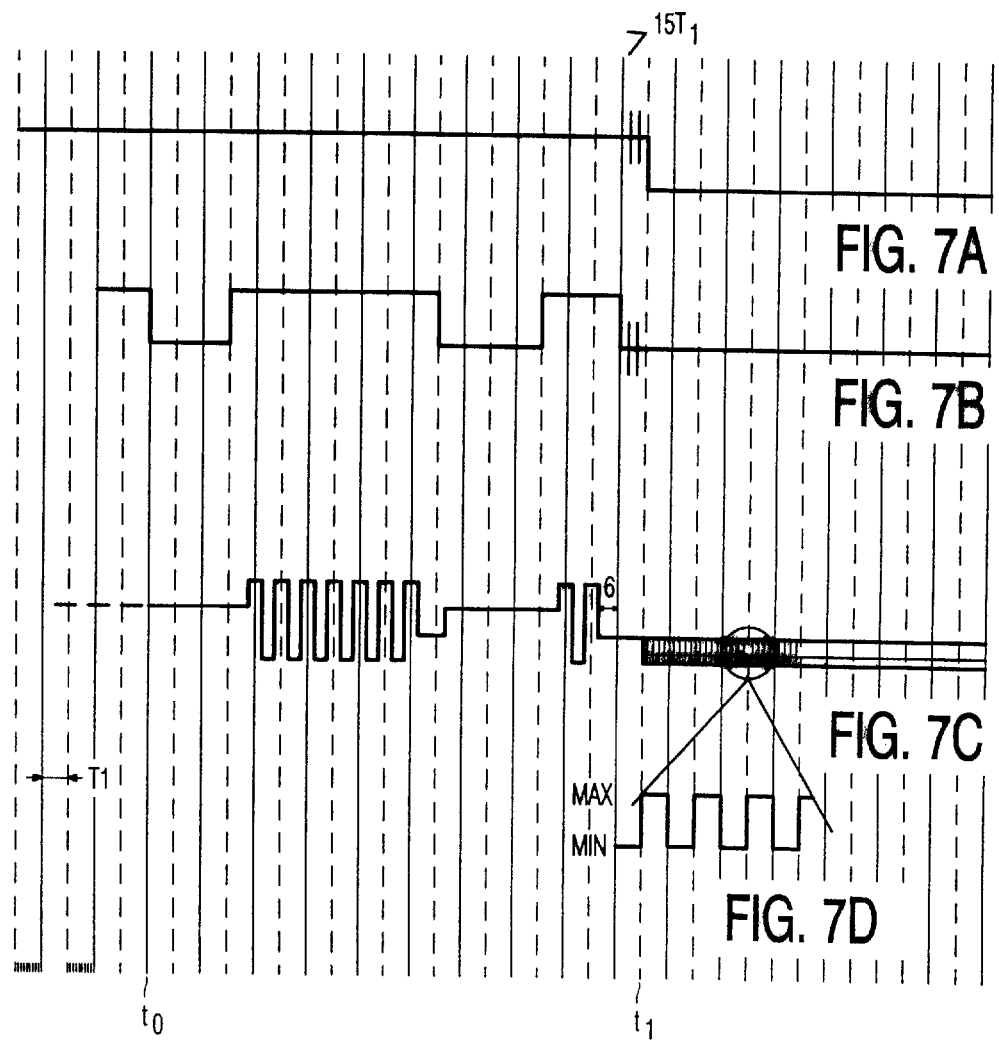

DEVICE HAVING A FIRST OPERATIONAL STATE FOR WRITING INFORMATION ONTO A RECORD CARRIER

FIELD OF THE INVENTION

The invention relates to the field of thermomagnetic recording and more specifically to control of the radiation source in thermomagnetic recording.

BACKGROUND OF THE INVENTION

The invention relates to a device having a first operational state for writing information onto a record carrier, including a phase-locked loop for generating, in the first operational state, a clock signal from a reference signal, a control unit for generating, in the first operational state, a pulsed transducer control signal in response to an information signal and the clock signal, a transducer for generating, in the first operational state, physically detectable patterns in the record carrier in response to the transducer control signal.

A device of this type is known from U.S. Pat. No. 5,126,985. The device is suitable for writing information onto a record carrier of the thermomagnetic type. In the known device, the transducer for generating, in the first operational state, physically detectable patterns in the record carrier includes an optical write head and a magnetic write head. The device is provided with a synchronizing circuit for generating control signals from the information signal for the optical write head and the magnetic write head. The synchronizing circuit includes a phase-locked loop which generates a clock signal from the information signal. Here the pulse-generator is provided by a delay unit. The pulsed transducer control signal generated by the pulse-generator is provided by the clock signal delayed in the delay unit. This transducer control signal is a response to the clock signal and the information signal. The feedback signal-generator for generating a feedback signal in response to the clock signal is provided by a connection between the controllable oscillator and the error signal-generator. The error signal-generator includes apparatus for generating an instantaneous error signal which is a measure of the instantaneous difference in phase between the information signal and the clock signal which has been fed back. The error signal-generator also includes a loop filter generating an error signal from the instantaneous error signal, which is a measure of an average difference in phase between the information signal and the feedback signal. In this case, the control signal-generator is provided by a direct connection between the loop filter and the controllable oscillator. The error signal is used as a control signal.

When optically reading information from a record carrier, a read head provided with a radiation source is usually used. A radiation beam generated by the radiation source is imaged on the record carrier. By detecting radiation reflected by the record carrier, a read signal can be generated which represents the information recorded on the record carrier.

The above citation is hereby incorporated herein in whole by referenced.

SUMMARY OF THE INVENTION

The inventors recognize radiation sources used for these purposes exhibit noise which can be called "relative intensity noise". This is a drawback because this noise also leads to disturbances in the read signal.

It is an object of the invention to provide a device of the type described in the opening paragraph, in which the influence of relative intensity noise when reading a record carrier is limited. According to the invention, the device has a second operational state for reading information from a record carrier. The device includes a transducer for generating, in the second operational state, a read signal in response to physically detectable patterns in the record carrier. The transducer for generating the read signal includes a radiation source. The also includes a power supply which supplies. The radiation source with an electric power, the phase-locked loop includes a memory for memorizing, in the first operational state, a memory value which is a measure of the supplied clock signal, while, in the second operational state, the phase-locked loop generates the clock signal in response to the memorized memory value, and, causes a high-frequency modulation in the electric power supplied by the power supply.

In the device according to the invention, the power with which the radiation source is fed is high-frequency modulated, for example, at a frequency of several hundred MHz, for example, 500 MHz. The inventors have found that this reduces the influence of relative intensity noise. In the device according to the invention, no separate oscillator is necessary for high-frequency modulation of the power for the radiation source. The controllable oscillator, which, in the first operational state, supplies the clock signal for the pulse-generator, functions, in the second operational state, as an oscillator for causing the high-frequency modulation.

These and other aspects of the invention are apparent from and will be elucidated in the description the embodiments described hereinafter with reference to the following drawings which illustrate the element of the claimed invention.

BRIEF DESCRIPTION OF THE DRAWINGS

FIG. 4 shows diagrammatically the possible contents of a look-up table used in the device, FIG. 7 shows some signals in the device of FIG. 1.

DETAILED DESCRIPTION OF THE PREFERRED EMBODIMENTS

Figure 1:
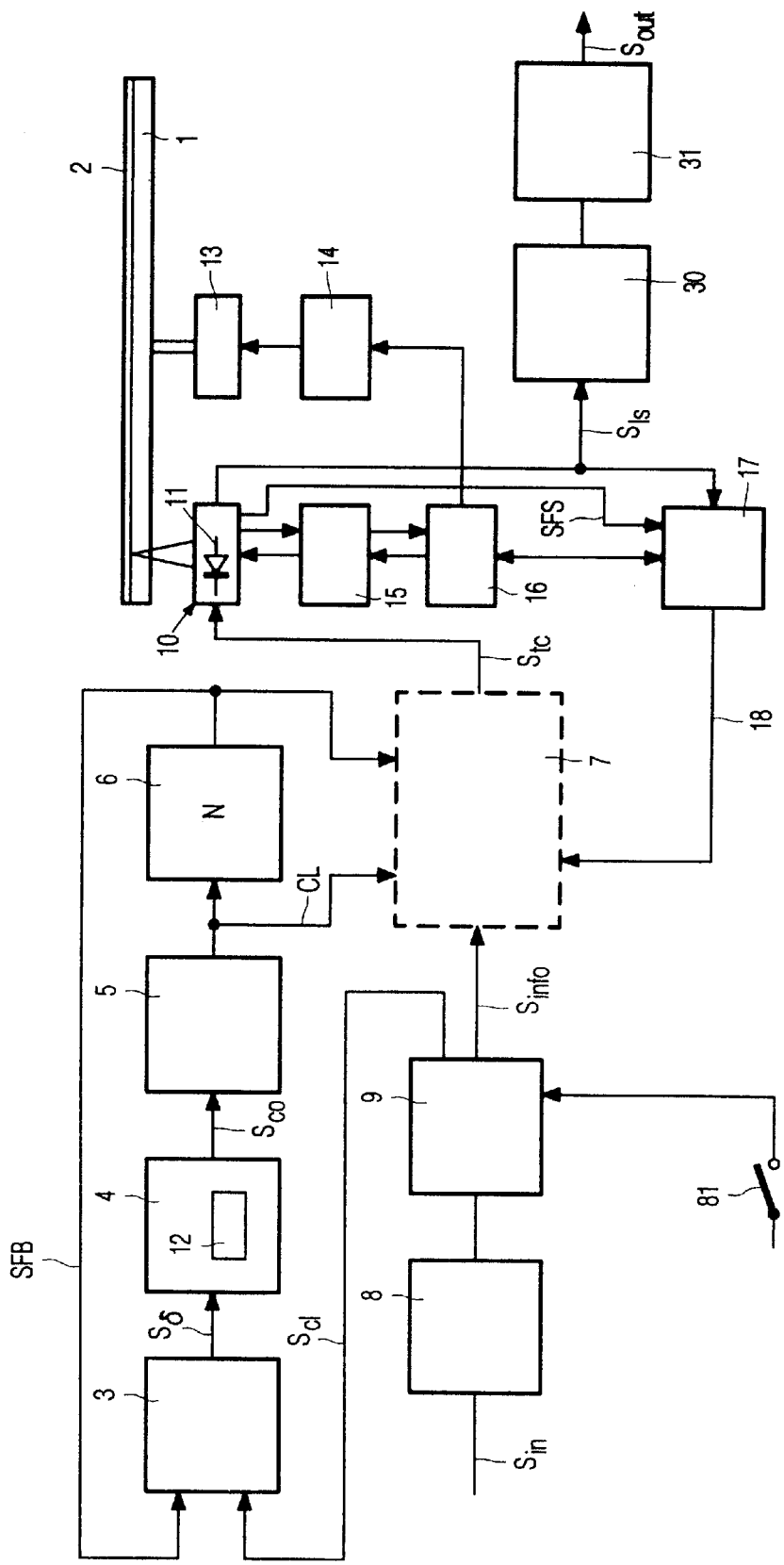
FIG. 1 shows diagrammatically a device according to the invention.

FIG. 1 shows a device having a first operational state for writing information onto a record carrier 1. The record carrier 1 is, for example, of a type which is writable once, for example, a record carrier of the ablative type. Alternatively, the record carrier may be of a type which is rewritable, for example, a record carrier provided with an information layer of a material having an amorphous structure which can be locally converted into a crystalline structure by consecutively heating and cooling the information layer. Such a material is, for example, an alloy of Te, Se and Sb. A survey of such materials is given in "Principles of Optical Disc Systems" by G. Bouwhuis, J. Braat, A. Huyser, J. Pasman, G. van Rosmalen and K. Schouhamer Immink, Adam Hilger Ltd., Bristol 1985, pp. 219–225 which is hereby incorporated herein in whole by reference. Alternatively, the record carrier may be, for example, of the magneto-optical type. These record carriers are provided with an information layer of a magnetizable material. The magnetization is influenced by locally heating the information layer above the Curie temperature, for example, by means of a laser beam and by simultaneously applying a magnetic field. The device shown includes a phase-locked loop 3–6 for receiving a reference signal SCL in the first operational state and for generating a clock signal CL from the reference signal SCL. In the embodiment shown, the reference signal SCL is also a clock signal, namely a clock signal which is synchronous with the information to be written. The phase-locked loop 3–6 includes error signal-generator 3 for generating an error signal Sδ which is a measure of an average difference in phase between the reference signal SCL and a feedback signal SFB. The phase-locked loop 3–6 also includes control signal-generator 4 for receiving the error signal Sδ and generating an oscillator control signal Sco which is dependent on the error signal Sδ. A controllable oscillator 5 supplies the clock signal CL in response to the oscillator control signal Sco. Feedback signal-generator 6 generate a feedback signal SFB in response to the clock signal CL. In the embodiment shown, the feedback signal-generator 6 are constituted by a frequency divider.

The device includes a control unit 7 for generating, in the first operational state, a pulsed transducer control signal in response to an information signal Sinfo and the clock signal CL. The control unit also uses the feedback signal SFB.

The information signal is generated from an input signal Sin. An error correction encoding is applied with the aid of the error correction encoding 8. From the signal thus obtained, the information signal is subsequently generated by channel encoding with channel encoding 9. The channel encoding 9 also generate the reference signal SCL. This is a clock signal which is in phase with the information signal Sinfo. Alternatively, the information signal Sinfo itself may serve as a reference signal for the PLL. The channel encoding 9 is, for example, EFM or EFM+ channel encoding apparatus means.

In the first operational state, a transducer 10 generates physically detectable patterns in the information layer 2 of the record carrier 1 in response to the transducer control signal Str.

The device has a second operational state for reading information from a record carrier 1. The record carrier 1 may be a record carrier which is written in the first operational state by means of the device but may be alternatively a record carrier provided with an information layer in a different way, for example, in a different device, for example, a device in which the information layer is obtained by pressing. The device includes a transducer 10 for generating, in the second operational state, a read signal Sls in response to physically detectable patterns in the record carrier. The transducer 10 for generating the read signal includes a radiation source 11. The device also includes a power supply, here constituted by the control unit 7, which supplies the radiation source with an electric power. The control signal-generator 4 include memory 12 for memorizing, in the first operational state, a memory value which is dependent on the error signal Sδ. In the second operational state, the control signal-generator 4 generates the oscillator control signal Sco in response to the memorized memory value. In the second operational state, the phase-locked loop causes, by means of its output signal So, a high-frequency modulation in the electric power supplied by the power supply 7.

In the embodiment shown, the device is intended for reading and writing information from/onto a disc-shaped record carrier 1. To this end, the device has a motor 13 for rotating the record carrier 1, and a drive unit 14 for driving the motor 13. The radial position of the transducer 10 is determined by a servosystem 15. The servosystem 15 and the drive unit 14 are controlled by a microprocessor 16. The motor 13, the drive unit 14, the servosystem 15 and the microprocessor 16 are of a conventional type. The device also includes a control unit 17 controlled by the microprocessor 16. The control unit 17 receives signals SFS, Sls from one or more sensors, and in response thereto, adapts parameters of the control unit 7 via a serial bus 18. With these parameters, the supplied radiation power of the radiation source 11 is not influenced by ageing and/or heating of the radiation source 11. Also, power supplied to the radiation source 11 may be adapted to the state of the record carrier 1 so that, for example, also in the presence of fingerprints on the record carrier 1, the write signal can be recorded in a reliable manner. In the embodiment shown, the device has a switch 81. A user can operate this switch 81 so that the device assumes either the first or the second operational state. In the second operational state, the value of the information signal Sinfo is maintained until the device again assumes the first operational state.

Figure 2:
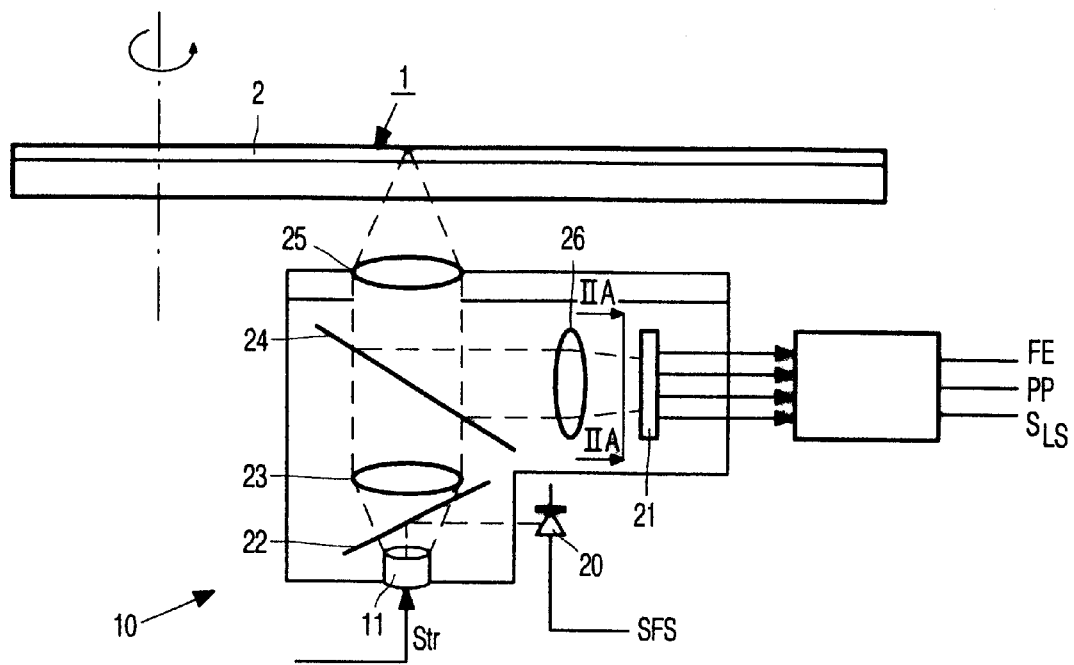
FIG. 2 shows a transducer used in the device.
Figure 2A:
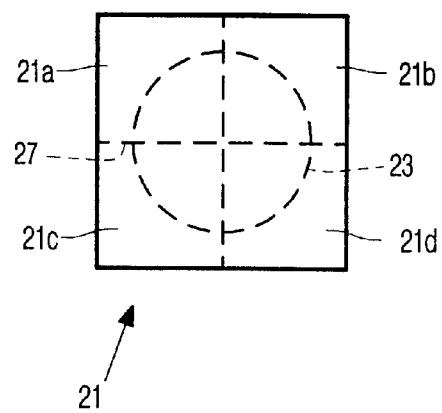
FIG. 2A shows a detail of the transducer, taken on the line IIA—IIA in FIG. 2.

In the embodiment shown, the transducer 10 is used both for writing information onto the record carrier and for reading information from the record carrier. Alternatively, different transducers may be used for reading and writing information. The transducer 10 is shown in greater detail in FIG. 2. In addition to the radiation source 11, the transducer also includes an optical system and a first detector 20 and a second detector 21. The optical system is provided with a first beam splitter 22, a lens 23, a second beam splitter 24, a focusing objective 25 and an astigmatic element 26. The second detector 21 is divided into sub-detectors, while at least sub-detectors are arranged on both sides of a line 27 (see FIG. 2A) indicating a direction of a track to be written on a record carrier. In the first operational state, the radiation source 11 generates a radiation beam in response to the control signal Str. The first beam splitter 22 images a fraction of the radiation in the radiation beam on the first detector 20. The output signal SFS, supplied by the first detector 20, is applied to the control unit 17 for adapting the power supplied to the radiation source 11 to the response of the radiation source 11 to the supplied power. The radiation beam is further imaged on the information layer 2 of the record carrier 1 by the lens 23, via the beam splitter 24, and by of the focusing objective 25, and this beam causes a physically detectable (in this case an optically detectable) effect on this record carrier. In the second operational state of the device, a radiation beam is also generated with the radiation source 11. Similarly as in the first operational state, the radiation beam is imaged on the information layer 2. Dependent on the optically detectable effect, the information layer 2 reflects a larger or smaller quantity of radiation. The reflected radiation is imaged on the detector 21 via the focusing objective 25, the beam splitter 24 and the astigmatic element 26. In response to the radiation imaged thereon, the detector 21 generates a signal, in this case a fourfold signal. A signal FE, a signal PP, and the read signal Sls are derived from the fourfold signal by a preprocessor. The signal FE is used by the servosystem 15 for controlling the focus of the radiation beam on the record carrier 1. The signal PP uses the servosystem for the radial positioning of the transducer 10.

An output signal Sout is generated from the read signal by error correction decoder 30 and channel decoder 31.

Figure 3:
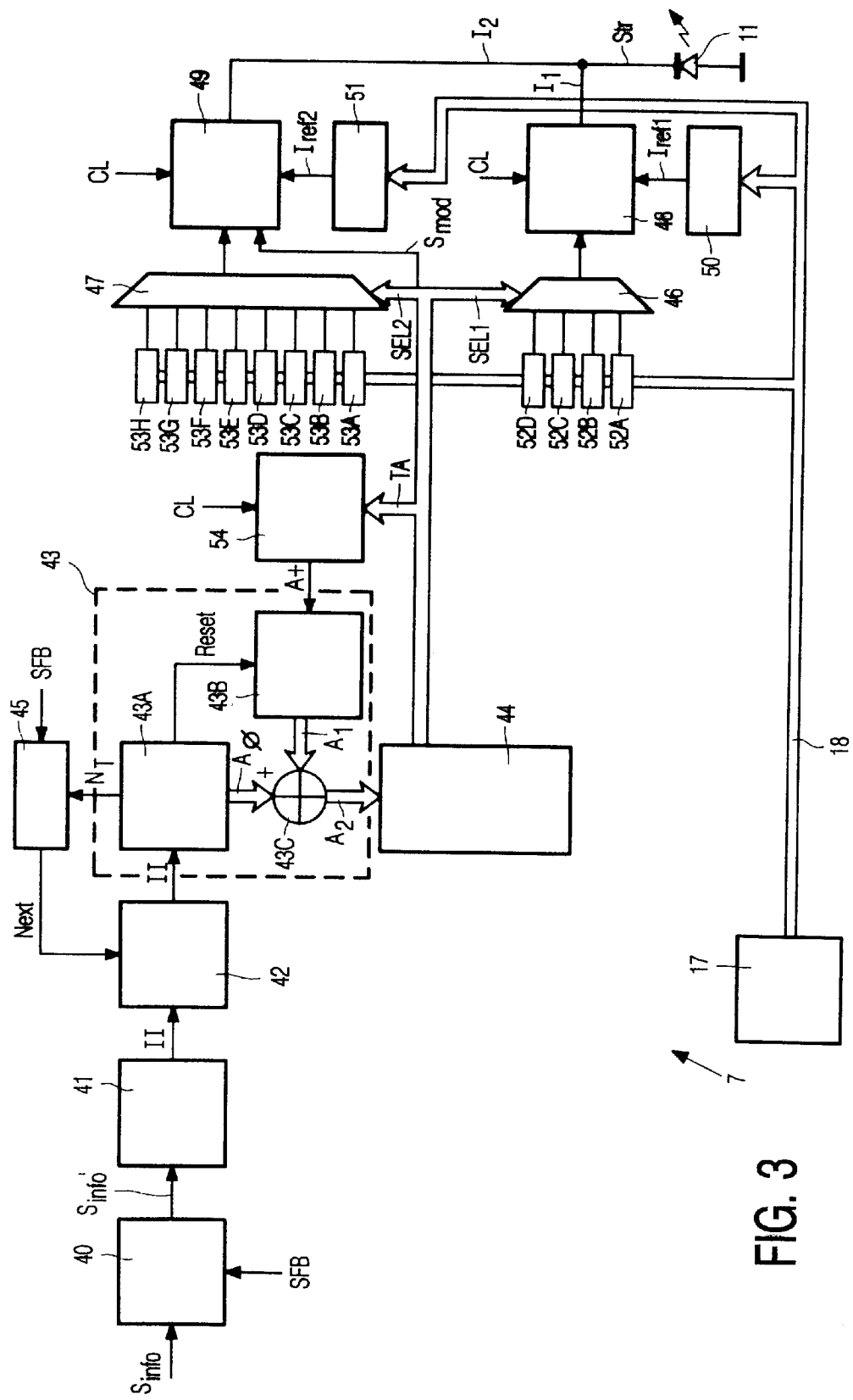
FIG. 3 shows, in greater detail, a control unit of the device of FIG. 1.

The control unit 7 for generating the control signal from the information signal is shown in greater detail in FIG. 3. The control unit 7 includes a first circuit 40 for generating a resampled information signal Sinfo' which is synchronized with the feedback signal SFB. The first circuit 40 is implemented as a sample-and-hold register which samples the information signal Sinfo upon every pulse of the feedback signal SFB and retains the sampled value until the next pulse of the feedback signal SFB. In practice, the resampled information signal Sinfo' will be substantially identical to the information signal Sinfo. The resampled information signal Sinfo' is applied to a detection circuit 41 for detecting the duration of a time interval in which the information signal is "high". After terminating the time interval, the circuit generates a first information identification II. The information identification II indicates that the resampled information signal Sinfo' was "high" during the duration. When the resampled information signal Sinfo' is "low", the circuit generates a second information identification II during each period of the feedback signal, which second identification indicates that the resampled information signal Sinfo' was low for 1 period of the feedback signal.

The generated first information identification also includes an indication of the duration of a time interval preceding the time interval in which the resampled information signal Sinfo' was "low". This has the advantage that, when generating the transducer control signal Str for a given logic value of the resampled information signal Sinfo', the history of the resampled information signal Sinfo' can be taken into account. This is important, for example, for phase change recording. In this type of recording, radiation in the form of a series of radiation pulses having a relatively high intensity is generated at a first logic value. Radiation having a relatively low intensity is generated at a second logic value.

The information identification II cannot be generated until after termination of the time interval of a period in which the resampled information signal Sinfo' is "high". Since the duration of these time intervals varies, a delay, which is dependent on the contents of the resampled information signal Sinfo', is produced in the detection circuit 41. To this end, the detector 41 supplies the information identification II to a FIFO register 42. An address generator 43 can subsequently read the information identification II with a constant delay with respect to the resampled information signal Sinfo' from the FIFO register 42. The address generator 43 generates an address A2 of a location in a look-up table 44. The address generator 43 has a first unit 43A for generating a start address A0 and a second unit 43B for generating a relative address A2. A summing device 43C calculates the generated address A2 as the sum of the start address A0 and the relative address A1.

The look-up table 44 includes parameters for generating a control signal Str for the transducer 10. The address generator 43 also charges a counter 45 with a count NT which corresponds to the duration of an event. An event is herein understood to mean a period in which the resampled information signal Sinfo' was uninterruptedly "high", or in which the resampled information signal Sinfo' was "low" during a period of the feedback signal SFB, or in which the device is in the second operational state during a period of the feedback signal SFB. The detector 41 detects that the device is in its second operational state when no changes in the resampled information signal Sinfo' have been observed for a period which is longer than the reference period. The reference period is, for example, 15 cycli of the feedback signal SFB. The counter 45 generates a signal Next which causes the FIFO to supply an information identification II associated with a subsequent event to the address generator 43.

The look-up table 44 includes, inter alia, information SEL1, SEL2 about the value of a control signal Str to be generated and about the duration TA in which this value must be maintained. An example of a look-up table is shown in FIG. 4. The look-up table 44 also includes information Smod indicating whether the transducer control signal Str must be modulated or not. The information about the value of the control signal Str is in the form of selection signals SEL1, SEL2 for multiplexers 46, 47. In response to a first selection signal SEL1. a first multiplexer 46 supplies a digital value to a first D/A converter 48. In response to this digital value, the D/A converter supplies a minimal current I1 which is necessary to cause the radiation source 11 of the transducer 10 to be controlled to give a response. The power of the current I1 supplied is also proportional to a first reference value Iref1 stored in a register 50. The first multiplexer selects the digital value for the D/A converter from 4 registers 53A–D with reference to the selection signal SEL1. In response to a second selection signal SEL2, the second multiplexer 47 supplies a digital value to a second D/A converter 49. In response to the digital value, the second D/A converter 49 supplies a further current I2 which is added to the current I1 supplied by the first D/A converter 48 and is supplied to the radiation source 11 in the transducer 10. The further current I2 is proportional to a second reference value Iref2 stored in a register 51. The duration TA for maintaining a value of the control signal Str is in the form of a count for a counter 54. The counter 54 counts a number of pulses of the clock signal CL corresponding to this count and, after termination, supplies a signal to the second unit 43B of the address generator 43 which causes the relative address A1 and hence the generated address A2 to increase by 1. The registers 50, 51, 52A–52D and 53A–53H are coupled to the control unit 17 via the serial bus 18.

Figure 5:
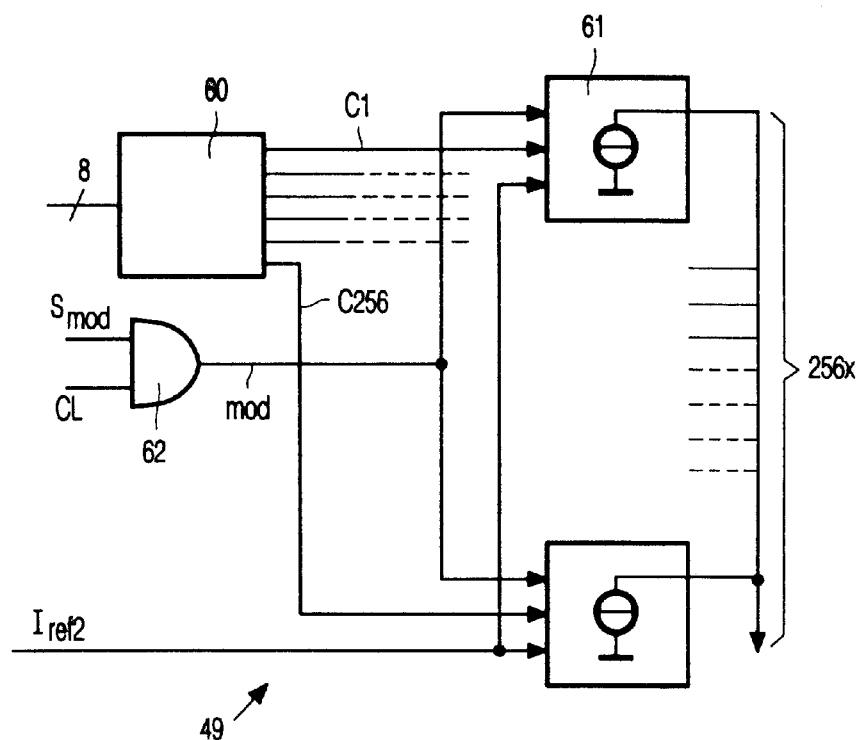
FIG. 5 shows, in greater detail, a part of the control unit shown in FIG. 3.

FIG. 5 shows the second D/A converter 49 in greater detail. This converter 49 includes a decoder 60 which converts the digital value supplied by the second multiplexer 47, here an 8-bit value, into a set of 256 digital signals c1-c256. Each of the signals c1-c256 switches its own current source 61. The second D/A converter 49 also includes an AND gate 62 having a first input which receives the clock signal CL and a second input which receives the signal Smod, indicating whether the control signal Str must be modulated or not. An output of the AND gate 62 is connected to each current source 61. Furthermore, each current source 61 receives the signal Iref1 from the register 50, representing the reference current.

Figure 6:
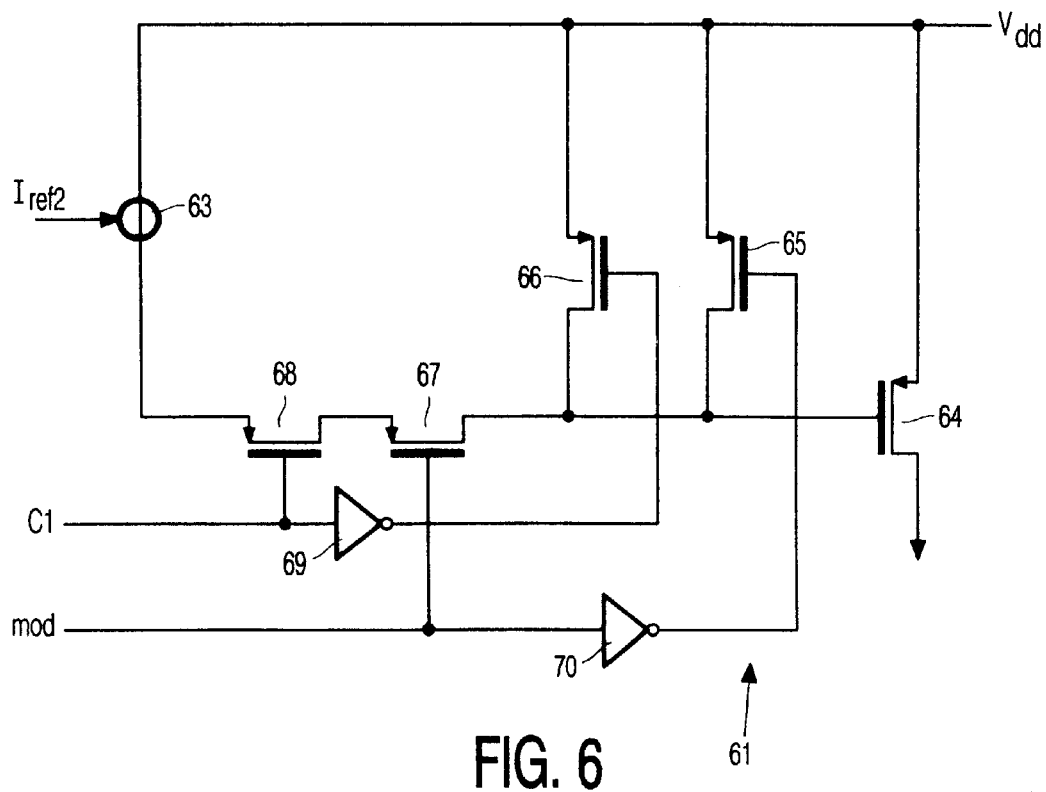
FIG. 6 shows a further detail of the detail shown in FIG. 5.

One of the current sources 61 is shown in greater detail in FIG. 6. The other current sources are identical. The current source 61 includes a first controlled voltage source 63 which is controlled by the signal Iref2 representing the reference current. In the activated state, a first semiconductor element 64 generates a current which depends on the voltage supplied by the voltage source 63. The first semiconductor element 64 is activated when the semiconductor switches 67, 68 are conducting and the semiconductor switches 65, 66 are non-conducting. The state of the semiconductor switches 67, 68 is determined by the output signal c1 of the decoder 60. The state of the semiconductor switches 65, 67 is determined by the modulation signal mod. When information is being written, the modulation signal mod has such a value that the semiconductor switch 67 is conducting and the semiconductor switch 65 is non-conducting. The state of the semiconductor element 64 is now entirely determined by the semiconductor elements 66, 68 which are controlled by the signal c1. When information is being read, the signal Smod assumes a logic value "1". As a result, the signal mod follows the clock signal CL. Now, the semiconductor switches 65, 67 are alternately rendered conducting and non-conducting at the frequency of the clock signal CL.

The first D/A converter 48 differs from the second D/A converter 49 in that it has no input for Smod. In other respects, the first D/A converter 48 is identical to the second D/A converter 49.

The phase-locked loop 3–6 may be of a conventional type as described in, for example, U.S. Pat. No. 5,410,572 hereby incorporated herein whole be reference. The phase-locked loop described in this patent has memory in the form of a capacitive element. Another conventional phase-locked loop is described in U.S. Pat. No. 5,028,885. The last-mentioned document describes a phase-locked loop provided with digital memory. Alternatively, a phase-locked loop of the type described in the simultaneously filed application PHN 17.248 may be used. That application is hereby incorporated herein in whole by reference. The phase-locked loop described in that application has switching apparatus which ensure that, during reception of a valid reference signal, the digital memory does do not form part of the loop constituted by the error signal-generator, the controllable oscillator and the feedback signal-generator.

The operation of the device according to the invention is elucidated with reference to FIG. 7. For the description below, it is assumed that the reference signal Scl and hence the feedback signal has a frequency of 69.12 MHz. It is further assumed that the feedback signal-generator 6 divides the frequency of the clock signal CL by a factor of 8 so that the clock signal CL has a frequency of 552.96 MHz. The vertical broken lines indicate transitions of the feedback signal SFB which is locked by the phase-locked loop 3–6 with the reference signal SCL or which is generated autonomously by the phase-locked loop in the absence of a reference signal SCL. The feedback signal SFB has a period T1. FIG. 7A shows the state signal R/W. Prior to instant t1, the device is in its first operational state in which information is written onto the record carrier 1. After the instant t1, the device assumes the second operational state in which information is read from the record carrier 1. In the example shown, the resampled information signal Sinfo' is an EFM or EFM+ signal. Such a signal may be "low" for periods between 3 T1 and 11 T1 and "high" also for periods from 3 T1 to 11 T1. When writing the resampled information signal Sinfo' onto the record carrier, a "high" period is registered as a mark with a length corresponding to the duration of the "high" period. A "low" period is registered as an unwritten area between marks and with a length which corresponds to the duration of the "low" period. Generally, the length of a mark is mainly equal to the duration of a "high" period of the information signal multiplied by the write velocity. The length of a mark may therefore be expressed in channel bit lengths, in which one channel bit length corresponds to the duration T1 of a channel bit period, i.e. a period of the feedback signal SFB multiplied by the write velocity. The data is written in an optical record carrier 1 having an information layer 2. The marks representing the information are written in a track on the information layer 2 by the radiation source 11. The marks are areas of the information layer 2 having an optical characteristic which deviates from that of its surroundings. This provides the possibility of optically reading the marks. The resampled information signal Sinfo' shown in FIG. 7B consecutively has a first "low" period of 3 T1, a first "high" period of 8 T1, a second "low" period of 4 T1 and a second "high" period of 3 T1.

Every period T1 in which the information signal is "low" is detected as such by the detector 41. After the address generator 43 has loaded the information identification II, indicating that the resampled information signal Sinfo' was "low" during 1 cycle of the feedback signal SFB, the first unit 43A of the address generator 43 loads the counter 45 with the duration of the information identified by the information identification II, here 1 cycle of the feedback signal SFB. Moreover, the first unit 43A of the address generator 43 generates an absolute address A0 in the look-up table. Also, the first unit 43A of the address generator 43 initializes the second unit 43B with the signal "reset", generating a relative address A1 at a value 0. The sum of the absolute address A0 and the relative address A1 is the address A2 of a location which corresponds to the information. This address A2, which is denoted by ERASE in the example of FIG. 4, includes SEL1=0, SEL2=2, TA=8, SMOD=0 as parameters. The value of SEL1 causes the first multiplexer 46 to select the register 52A, and the value of SEL2 causes the second multiplexer 47 to select the register 53C. The values registered in these registers 52A, 53C, correspond to an adjustment of the power of the radiation source 11 at a first level of, for example, 1.8 mW required for erasing. This power is maintained during 8cycli of the clock signal CL. The transducer control signal Str, generated by the control unit 7, is shown in FIG. 7C. As stated hereinbefore, a delay having a duration of, for example, 16 cycli of the feedback signal SFB, occurs when generating the transducer control signal Str. However, for the sake of clarity, the transducer control signal Str is shown synchronously with the resampled information signal Sinfo' in FIG. 7. After 8 cycli have elapsed, a cycle of the feedback signal SFB has also elapsed. The counter 45 then causes new information identification II to be loaded from the FIFO register 42 in the first unit 43A of the address generator 43, in this case also an identification having a "low" value of the resampled information signal Sinfo' during 1 period of the feedback signal SFB. The power of the radiation source 11 is therefore maintained at the first level for another 8 cycli. This is also the case during the next cycle of the feedback signal SFB. After termination of this cycle, the address generator 43 loads an information identification II of one period in which the resampled information signal Sinfo' had a "high" value during 8 cycli of the feedback signal SFB. In response thereto, the first unit 43A of the address generator 43 loads the counter 45 with the value 8 and generates an absolute address A0 which is the start address of a series of locations in the look-up table 44 which includes the parameters corresponding to this information. Since the second unit 43B generating the relative address A1 is initialized at 0, the instantaneous address A2 is initially equal to the absolute address A0. This address A0 is denoted by WRITE*T1 in FIG. 4. The location with this address includes the parameters SEL1 32 0, SEL2= 2, TA=6, SMOD=0. At these parameters, the power of the radiation source is maintained during the period TA of 6 cycli of the clock signal CL at the first level required for erasing. The counting value TA=6 is loaded into the counter 54. The counter 54 counts a number of cycli of the clock signal CL corresponding to this counting value and then supplies a signal A+ to the second unit 43B constituted by the relative. address generator. Upon reception of this signal A+, the relative address generator 43B raises the relative address by 1. The instantaneous address A2 then indicates a location with the parameters SEL1=0, SEL2=3, TA=4 and SMOD=0. The first and the second multiplexer 46, 47 now choose their input signal from registers 52A and 53D, respectively. The power of the radiation source 11 increases to a second level (for example, 7.5 mW) required for writing a mark. After termination of the period of 4 cycli of the clock signal CL, the counter 54 causes the relative address generator 43B to raise the address A1 again so that now an instantaneous address is selected with the parameters SEL1=0, SEL2=0, TA=4 and SMOD=0. At these parameters, the power of the radiation source 11 is maintained for 4 clock cycli at a third level of, for example, 0 mW. Subsequently, the power of the radiation source 11 is again raised to the second level. Then the power is changed another five times between the second and the third level. Subsequently, a location of the look-up table 44 has been reached with the parameters SEL1=0, SEL2=1, TA=6 and SMOD=0. These parameters represent an adjustment of the power of the radiation source 11 at a fourth level (for example, 0.5 mW), intended for cooling the information layer 2.

If the detector 41 detects a period in which the resampled information signal Sinfo' has remained unchanged for a period of 15*T1, the state signal R/W assumes a value of 0. During every cycle of the feedback signal SFB when this state is maintained, the detector 41 supplies an information identification II which indicates this. In response thereto, the address generator 43 generates an address A2 which is denoted by "READ" in FIG. 4 and includes the parameters SEL1=0, SEL2=2, TA=8 and SMOD=1. It is thereby ensured that the power of the radiation source 11 is adjusted at a fifth level (for example, 0.5 mW, intended for reading. Since SMOD now has the logic value 1, the modulation signal MOD is now equal to the clock signal CL. As a result, the second D/A converter 49 is switched on and off at the frequency of the clock signal, here 552.96 MHz. The current Str supplied to the radiation source 11 is thereby modulated between a minimal value MIN and a maximal value MAX. The minimal value MIN is the current supplied by the first multiplexer 46. The maximal value MAX is the current which is jointly supplied by the D/A converters in the switched-on state of the second D/A converter. This is shown in greater detail in FIG. 7D. The time scale in this Figure has a resolution which is 8 times higher than in FIG. 7C. It has been found that such a modulation strongly reduces the occurrence of relative intensity noise in semiconductor radiation sources. Instead of generating the modulation signal MOD directly from the clock signal CL, the modulation signal could also be obtained from the clock signal CL via an additional frequency divider. In the embodiment shown, the frequency of the clock signal CL is, however, very suitable for modulating the radiation source 11.

The invention is not limited to the embodiment described. Many variations within the scope of the appendant claims can be conceived by those skilled in the art. In another embodiment, the device is intended for reading and writing information from/onto a record carrier of a different shape, for example, a tape-shaped record carrier. The invention also relates to each and every novel characteristic feature and each and every novel combination of characteristic features.

What is claimed is:

1. A device comprising:
   a phase-locked loop for generating, in a first operational state, a clock signal from a reference signal;
   a control unit for generating, in the first operational state, a pulsed transducer control signal in response to an information signal and the clock signal;
   a transducer for writing, in the first operational state, physically detectable patterns in the record carrier in response to the transducer control signal;
   a transducer for generating, in the second operational state, a read signal in response to physically detectable patterns in the record carrier, and including a radiation source;
   a power supply which supplies the radiation source with an electric power;
   and in which:
   the phase-locked loop includes memory means for memorizing, in the first operational state, a memory value which is a measure of the supplied clock signal, while, in the second operational state; and
   the phase-locked loop generates the clock signal in response to the memorized memory value, and, in the second operational state, causes a high-frequency modulation in the electric power supplied by the power supply.

2. The device of claim 1, in which:
   the device has a common transducer for reading and writing information from/onto the record carriers; and
   the control unit is used as a power supply for the radiation source during the second operational state.

3. The device of claim 2, in which the control unit includes means for detecting the duration of a time interval in which the information signal has a constant logic value, and for generating a signal which includes an indication of the duration.

4. The device of claim 3, in which the signal supplied by the detecting means also includes an indication of the duration of a time interval, preceding the time interval, in which the information signal has a different logic value.

5. The device of claim 1, in which the control unit includes means for resampling the information signal synchronously with the feedback signal.

6. The device of claim 1, further comprising error correction encoding means and/or channel encoding means for generating the information signal from an input signal by means of error correction encoding and/or channel encoding.

7. The device of claim 1, further comprising error correction decoding means and/or channel decoding means for generating an output signal from a read signal using error correction decoding and/or channel decoding.

8. The device of claim 1, further comprising a further control unit which receives signals from at least a sensor for a radiation power of radiation generated by the radiation source, or a sensor for measuring radiation reflected by the record carrier, the control unit controlling the radiation power depending on the received one or more signals.

* * * * *